United States Patent [19]

McMurtry

[11] Patent Number: 5,665,896
[45] Date of Patent: Sep. 9, 1997

[54] CALIBRATION OF AN ARTICULATING PROBE HEAD FOR A COORDINATE POSITIONING MACHINE

[75] Inventor: David R. McMurtry, Wotton-Under-Edge, United Kingdom

[73] Assignee: Renishaw PLC, Gloucestershire, United Kingdom

[21] Appl. No.: 700,788

[22] Filed: Aug. 21, 1996

[30] Foreign Application Priority Data

Aug. 23, 1995 [GB] United Kingdom ............... 9517214

[51] Int. Cl.$^6$ ................................................. G01B 7/00
[52] U.S. Cl. .................................. 73/1.75; 73/1.79
[58] Field of Search .............................. 73/1 J; 33/503, 33/556

[56] References Cited

U.S. PATENT DOCUMENTS

| | | | |
|---|---|---|---|
| 4,372,721 | 2/1983 | Harjar et al. | 73/1 J |
| 4,884,889 | 12/1989 | Beckwith, Jr. | 33/503 |
| 4,888,877 | 12/1989 | Enderle et al. | |
| 5,138,563 | 8/1992 | Debitsch et al. | |

FOREIGN PATENT DOCUMENTS 6-313710  11/1994  Japan ....................... 33/503

OTHER PUBLICATIONS

LK Tool Limited Technical Document "Manipulator Alignment" No Date.
LK Tool Limited Technical Document "PH9 Mapping".

*Primary Examiner*—Robert Raevis
*Attorney, Agent, or Firm*—Oliff & Berridge

[57] ABSTRACT

A method is disclosed whereby a probe head which articulates a probe on the moveable arm of a coordinate measuring machine is calibrated to reduce the effect of errors, such as misalignment of the rotary axes of the head, and droop of the head and the probe. The method involves measurement of the probe position at a number of orientations of the head, the angle of orientation being determined by encoders within the head. Pairs of adjacent orientations at which the probe position is measured define segments, over which it is assumed that all errors change linearly. From the measured probe positions, a value of actual angular displacement between measured probe positions is calculated. The position of the probe at a given angular orientation within a segment may then be determined from the encoder reading at that orientation, and the ratio of the actual angular displacement between measured probe positions to the difference in the encoder readings at the orientations defining the segment (and corresponding to these measured positions). The size of the segments depends upon the linearity with which the droop changes with changing angular orientation of the head; as the change in droop becomes less linear, the segment size decreases in order to ensure that the assumption of linearity remains valid.

5 Claims, 3 Drawing Sheets

CALIBRATION OF AN ARTICULATING PROBE HEAD FOR A COORDINATE POSITIONING MACHINE

BACKGROUND TO THE INVENTION

1. Field of the Invention

The invention relates to the calibration of an articulating probe head for a coordinate positioning machine. Coordinate positioning machines, such as coordinate measuring machines or machine tools, comprise an arm and a table movable relative to each other, typically with three linear degrees of freedom. Such machines may be equipped with a probe to enable inspection of the dimensions or contour of components. It is frequently desirable to orient the probe relative to the arm of the machine upon which it is mounted, in order to inspect differently oriented surfaces of a component.

2. Description of Related Art

One known-device providing two-axis orientation of a probe relative to the arm of the machine is the Renishaw PH9 probe head, which orients a probe into one of 720 discrete repeatable positions provided substantially about first and second orthogonal axes. The position of the probe in each of the 720 positions (or as many of the positions as are required) is pre-calibrated; because each of the positions is highly repeatable, i.e. each time the probe is oriented to a given position, it occupies substantially the same position in space, the calibration of the probe position takes account of errors such as droop of the probe under the influence of gravity.

A further type of probe head is known from U.S. Pat. No. 4,888,877, and provides continuous two-axis orientation of a probe relative to the movable arm, with the orientation of the probe being measured by encoders within the probe head.

Errors such as axis eccentricity, and non-perpendicularity of axes are pre-calibrated; errors due to droop are corrected by calculating the droop of the probe for a given angular orientation, and introducing a corresponding correction value into measurements subsequently made with the probe head at the said orientation (as shown in U.S. Pat. No. 5,138,563).

SUMMARY OF THE INVENTION

The present invention provides calibration of a probe head of either the indexing or measuring type which enables the position of the sensing tip of a probe lying within a given angular zone to be inferred on the basis of measurements of the position of the stylus tip made in two positions defining boundaries for the zone, wherein errors within the zone are assumed to alter linearly. This method takes account of all errors without ever measuring or calibrating for the value of any individual error source.

One embodiment of the present invention provides a method of operating a coordinate positioning machine having: an arm and a table movable one relative to another; an articulating probe head mounted to the arm for orienting a probe relative to the arm about at least one rotary axis, the probe head having at least one rotary axis member supporting said probe and an angular displacement transducer for measuring the angular orientation of said rotary axis member relative to a datum; the method comprising the steps of:

measuring the position of the probe at first and second angular orientations of said rotary axis member;

calculating an actual angular displacement between said measured probe positions;

orienting said rotary axis member to a third angular orientation, lying between said first and second angular orientations;

determining the position of the probe at the third angular orientation of said rotary axis member, by calculating, from said actual angular displacement, said third angular orientation, and at least the difference between said first and second angular orientations, an actual angular orientation of the probe corresponding to said third angular orientation of the rotary axis member.

BRIEF DESCRIPTION OF DRAWINGS

Embodiments of the invention will now be described, by way of example, and with reference to the accompanying drawings in which.

DESCRIPTION OF PREFERRED EMBODIMENTS

Figure 1:
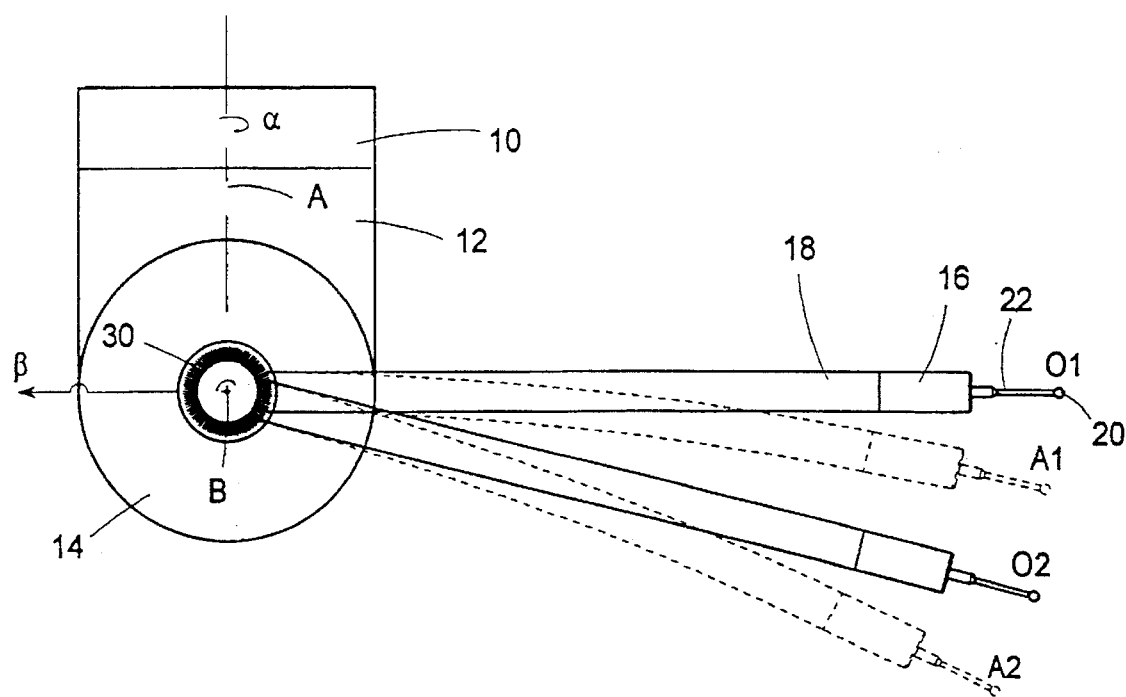
FIG. 1 is a schematic side view of a probe head.
Figure 2:
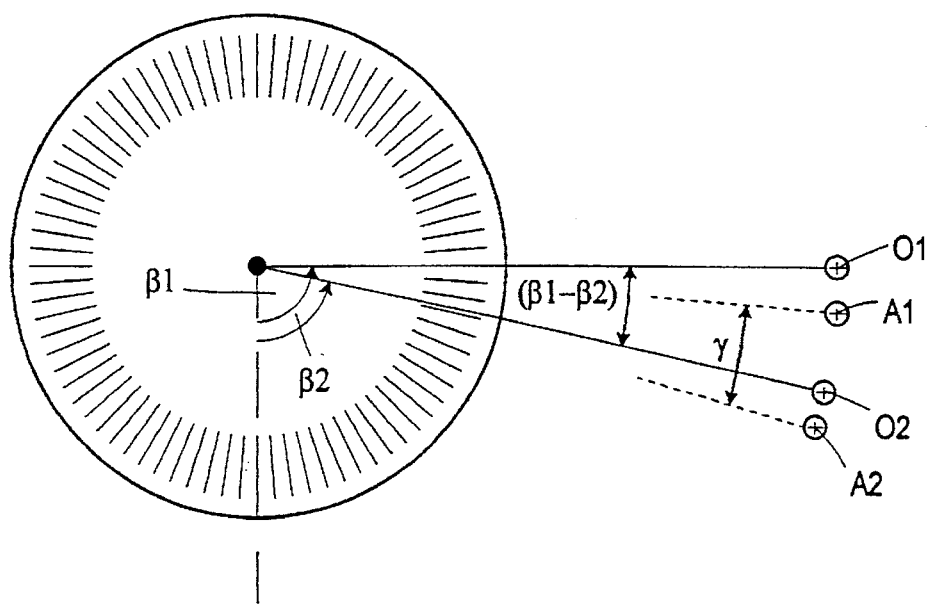
FIG. 2 is a schematic illustration of the basis of the calibration method of the present invention.

Referring now to FIGS. 1 and 2, a probe head PH orients a probe 16, mounted on the end of an extension bar 18, about substantially orthogonal axes A and B. The probe head PH includes a base 10, by means of which it is mounted to the movable arm of a coordinate positioning machine, together with first and second rotary axis members 12,14. Motors (not shown) and transducers, such as encoders 30 are provided to rotate the rotary axis members 12,14 and measure their angular orientation or "displacement angle" $\alpha,\beta$ about the A and B axes with respective to a reference angle.

Conceptually, any given point on the probe 16, such as the centre of sensing tip 20 lies within a spherical polar coordinate system, and its location may be defined precisely by the outputs $(\alpha,\beta)$ from the encoders 30, the distance between the tip 20 and the B axis, and the offset, of the plane of rotation of tip 20 from the A axis. In practice, however, many sources of error affect the actual position of the sensing tip 20, such as non-orthogonality of the A and B axes, non-intersection of the A and B axes, eccentricity of rotation of rotary axis member 12 and/or rotary axis member 14 about the A and/or B axes respectively, non-planar rotation of rotary axis member 12 and/or rotary axis member 14, and droop of the various elements of the probe head PH, extension bar 18, and the probe 16. The probe head PH may be calibrated for one or more of these errors by measuring the position of the sensing tip 20 at a plurality of angular orientations of rotary axis member 14, and then interpolating the error linearly between measured positions of the sensing tip 20. For the purposes of the present example only the error resulting from droop is considered due to its relatively predictable nature, however calibration of a probe head in accordance with the technique provided by the present invention will also account for all other error sources mentioned above.

The conceptual $O_1,O_2$ and actual $A_1,A_2$ positions of probe 16 about the B axis are illustrated for the angular positions $\beta=\beta_1$, and $\beta=\beta_2$ of rotary axis member 14. The actual positions differ from the conceptual positions as a result of a number of errors mentioned above (although only the error resulting from droop of the probe head PH, extension bar 18, and probe 16 has been illustrated). To reduce any. measuring error which would otherwise result from these error sources, one embodiment of the present invention provides that the position of the probe 16 is measured at a plurality of angular orientations β of rotary axis member 14, between each of which the various errors may be assumed to change linearly (if at all) to within the permissible. error budget of the probe head.

Figure 3:
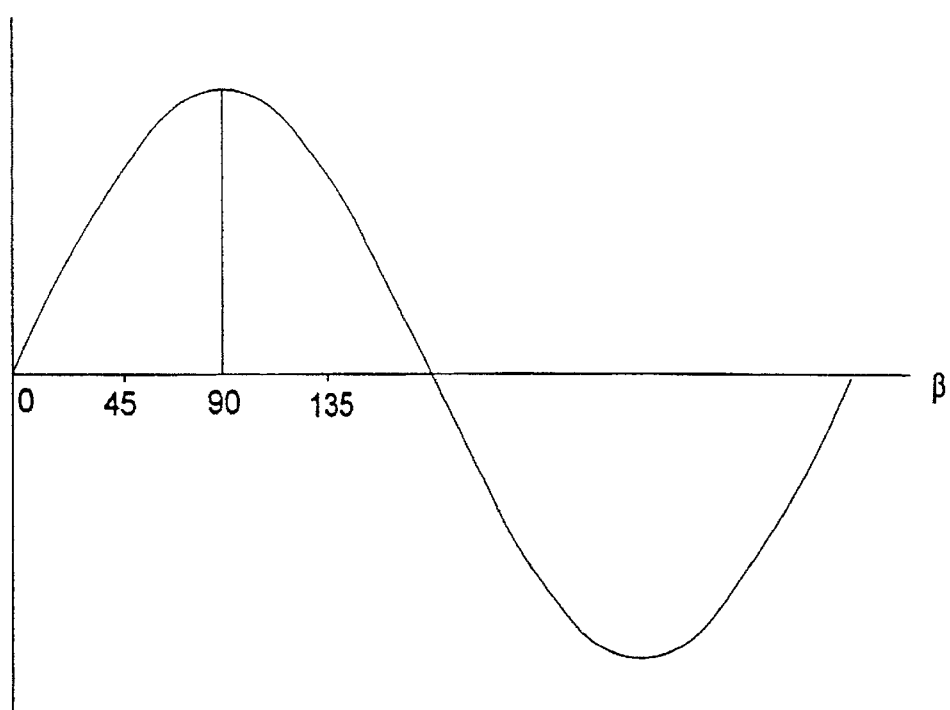
FIG. 3 is a graph showing the distribution of calibration points in the probe head of FIGS. 1 and 2.

Thus, in one example, the positions $A_1,A_2$ of stylus tip 20 are determined, and are used to calculate a value of actual angular displacement γ separating the tip positions $A_1,A_2$. The difference $(β_1-β_2)$ in the angular orientations $β_1,β_2$ of the rotary axis member 14 is then calculated. A calibration ratio may then be obtained yielding what is assumed to be the change in displacement angle of the stylus tip 20 about the B axis per unit of displacement angle of the rotary axis member 14 as given from the encoders 30, for the angular segment $β=β_1$ to $β=β_2$. In the present example, the calibration ratio is equal to $γ/(β_1-β_2)$. The actual angular orientation of the sensing tip 20 with respect to the reference angle in the segment $(β_1-β_2)$, and at an angle β of the rotary axis member 14 is thus inferred from the expression $βγ/(β_1-β_2)$. Similar calculations may be made for other angular segments about the B axis The size of angular segment within which the errors may be assumed to be linear varies depending upon the angular orientation β of the rotary axis member 14 about the B axis. Referring now to FIG. 3, it can be seen that the function describing the droop of probe head PH, extension bar 18, and the probe 16 with changing angular position β about the B axis is sinusoidal, and therefore approximates well to a linear function in the ranges $β=0°-45°$, and $β=135°-180°$. However the function is increasingly non-linear as β approaches 90°. The greatest density of measured values of position of the stylus tip 20 should therefore be in the region $β=90°$. All other sources of error vary randomly from one probe head to another, and therefore highly non-linear fluctuations in these sources of error over particular ranges of angular displacement cannot be predicted in advance.

Figure 4:
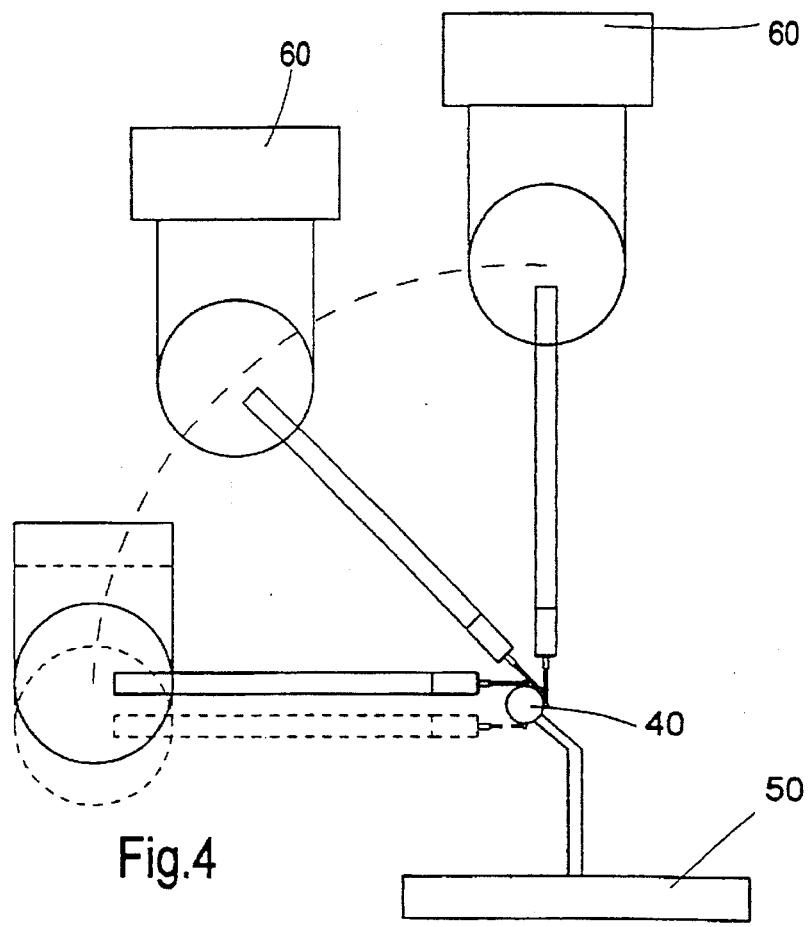
FIGS. 4 and 5 illustrate a calibration operation.
Figure 5:
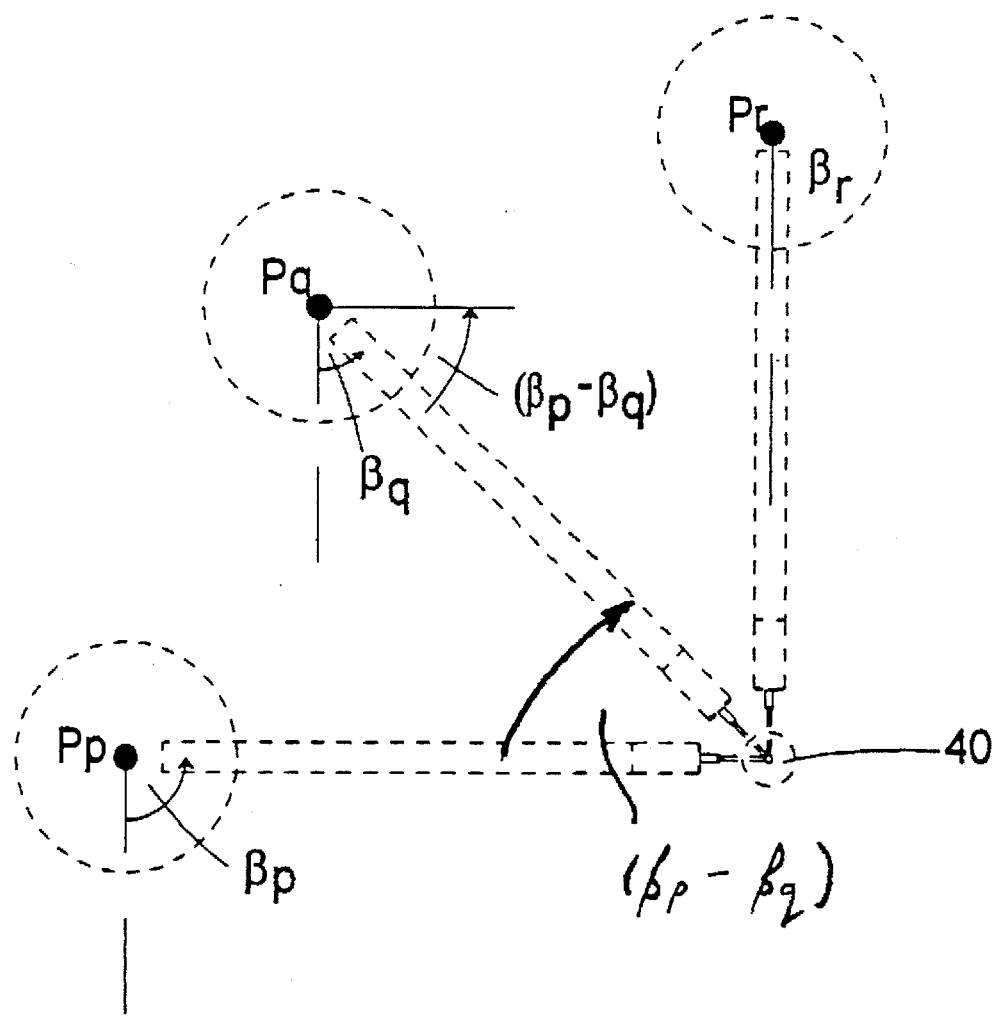

Referring now to FIGS. 4 and 5, the positions A of the sensing tip 20 at a plurality of angular orientations β of rotary axis member 14 are calculated as follows. The probe head PH is oriented to a given value of $β_p$ for which a measurement of the corresponding sensing tip 20 position value $A_p$ is required, and with the probe head PH in this orientation, the positions of a plurality (at least 4) of points on the surface of a sphere 40 (mounted to the table 50 of the machine) are measured. This is done in a manner known per se, by recording the outputs of transducers measuring the position of the movable arm 60 of the machine (to which probe head PH is mounted) at the instant stylus tip 20 touches the surface of sphere 40. From these measured values, coordinates defining the position $P_p$ of the centre of the sphere 40 are calculated. This process is repeated for orientations $β_q,β_r$, in respect of which corresponding sensing tip 20 positions $A_q,A_r$ are required.

Because when the surface of sphere 40 is being measured with different orientations $β_p,β_q,β_r$ of the probe head PH, the arm 60 is in a different spatial relationship with respect to the centre of sphere 40, measurements made with the probe head in different orientations will yield different coordinates for the position of the centre of the sphere 40. Given that the sphere 40 has remained static throughout, the positions $P_p,P_q,P_r$ defined by each set of coordinates will correspond to the (theoretical) position of the probe head PH when the centre of stylus tip 20 lies in the position of the centre of sphere 40. Therefore the actual angular displacement γ between adjacent measured sensing tip 20 positions $A_p,A_q$ for example will be equal to the angle subtended between adjacent positions $P_p,P_q$ at the centre of sphere 40.

In a further independent aspect of the present invention, the probe head may initially be calibrated in a plurality of predesignated angular orientations whose density takes account of the variation in non-linearity of the change in droop of the head PH with changing orientation β. This initial calibration may be made merely with a probe 16 (i.e. no extension bar 18) and a master stylus having at least three sensing tips. For each predesignated angular orientation (α,β) the position of the three sensing tips is determined, thereby defining a plane and a normal vector relative thereto. The normal vector will thus indicate, for each given pre-designated angular orientation (α,β) the direction in which the stylus 22 of the probe 16 will extend. If the probe head is then reequipped with a different configuration of probe and/or extension bar 18, this vector may be used to reduce the number of positions of the sensing tip 20 in respect of angular orientations defining the boundary of a linear error zone. This is because, once the new probe/extension bar configuration is connected to the probe head, measurement of a single tip position will enable the calculation of an offset vector, indicative of the offset in position of the sensing top with respect to the previously calculated normal vector. This offset vector may then be used in conjunction with the appropriate normal vector to infer the position of the sensing tip with the new configuration in other angular orientations for which a normal vector has been calculated. This technique may be employed in conjunction or independently of the inference technique described above.

Aspects of the present invention have been illustrated and described with reference to an articulating probe head which provides continuous orientation of a probe, and uses angular transducers in the form of encoders. The invention applies equally to indexing probe heads having other types. of transducer, such as potentiometers or stepper motors, for example.

Each technical feature or function referred to herein may be substituted by other features performing the same or a similar function, and other functions achieving the same a similar result. Further, none of the features or functions described herein are necessarily an essential element of the combination of features or functions in connection with which they are described; where the said combination of features can achieve the same or a similar result in the absence of one or more of its disclosed elements, such elements are inessential.

The different features of the invention described above are not necessarily limited to their association with the embodiments in connection with which they were described. Many aspects of the invention are generally applicable to other embodiments of the invention described herein.

I claim:

1. A method of operating a coordinate positioning machine having: an arm and a table movable one relative to another; an articulating probe head mounted to the arm for orienting a probe relative to the arm about at least one rotary axis, the probe head having at least one rotary axis member supporting said probe and an angular displacement transducer for measuring the angular orientation of said rotary axis member relative to a datum; the method comprising the steps of:

measuring the position of the probe at first and second angular orientations of said rotary axis member;

calculating an actual angular displacement between said measured probe positions;

orienting said rotary axis member to a third angular orientation, lying between said first and second angular orientations;

determining the position of the probe at the third angular orientation of said rotary axis member, by calculating, from said actual angular displacement, said third angular orientation, and at least the difference between said first and second angular orientations, an actual angular orientation of the probe corresponding to said third angular orientation of the rotary axis member.

2. A method according to claim 1 wherein said probe head is calibrated over a plurality of angular segments defined by pairs of angular orientations of said rotary axis member.

3. A method according to claim 2 wherein the magnitude of each of said segments varies in dependence upon the rate of change of droop of said probe and probe head with respect to angular orientation of the rotary axis member.

4. A method according to claim 3 wherein the rate of change of droop with respect to angular orientation of the rotary axis member is substantially linear for each of said segments to within permissible error limits for the probe head.

5. A method according to claim 1 wherein said probe position is measured by operating the machine to measure, with the probe, the position of a feature provided on the table of the machine at each of said angular orientations.

* * * * *